United States Patent
Choi et al.

(10) Patent No.: US 8,915,604 B2
(45) Date of Patent: Dec. 23, 2014

(54) PRISM SHEET, BACKLIGHT UNIT INCLUDING THE SAME, AND OPTICAL DISPLAY APPARATUS INCLUDING THE SAME

(71) Applicants: Mi Jeong Choi, Uiwang-si (KR); Kyoung Gon Park, Uiwang-si (KR); Su Kyong Lee, Uiwang-si (KR)

(72) Inventors: Mi Jeong Choi, Uiwang-si (KR); Kyoung Gon Park, Uiwang-si (KR); Su Kyong Lee, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 63 days.

(21) Appl. No.: 13/729,772

(22) Filed: Dec. 28, 2012

(65) Prior Publication Data

US 2013/0170188 A1    Jul. 4, 2013

(30) Foreign Application Priority Data

Dec. 29, 2011    (KR) .................. 10-2011-0146573

(51) Int. Cl.
  *G09F 13/04* (2006.01)
  *G02B 5/04* (2006.01)
  *G02F 1/1335* (2006.01)

(52) U.S. Cl.
  CPC ............. *G02B 5/045* (2013.01); *G09F 13/04* (2013.01); *G02F 2001/133607* (2013.01)
  USPC ..................... 362/97.1; 362/626; 362/620

(58) Field of Classification Search
  USPC ........................... 362/97.1, 626, 620
  See application file for complete search history.

(56) References Cited

U.S. PATENT DOCUMENTS

2009/0122577 A1*  5/2009  Wu et al. .................. 362/627
2011/0181810 A1*  7/2011  Miyamoto et al. ............. 349/64

FOREIGN PATENT DOCUMENTS

| KR | 10-2009-0058679 A | | 6/2009 | |
| KR | 10-2010-0002197 A | | 1/2010 | |
| KR | 10-2009-0058679 | * | 6/2014 | .............. G02B 5/04 |

OTHER PUBLICATIONS

English translation of KR 10-2007-0125384.*
Korean Office action dated Mar. 14, 2014 for KR 10-2011-0146573 (Mi Jeong Choi, et al.).

* cited by examiner

*Primary Examiner* — Evan Dzierzynski
(74) *Attorney, Agent, or Firm* — Lee & Morse, P.C.

(57) ABSTRACT

A prism sheet includes a base film having one flat surface and an optical refractive section having a plurality of prisms arranged along a first direction to constitute first and second prism parts. The optical refractive section is integrally formed with another surface of the base film that is opposite to the flat surface of the base film, and each of the prisms has a predetermined cross-sectional shape. The first prism part includes a first prism of the plurality of prisms, which first prism has a constant height along a second direction that intersects the first direction. The second prism part includes a second prism of the plurality of prisms, which second prism has a variable height in the second direction, and a maximum value of the variable height of the second prism is higher than the constant height of the first prism.

20 Claims, 7 Drawing Sheets

PRISM SHEET, BACKLIGHT UNIT INCLUDING THE SAME, AND OPTICAL DISPLAY APPARATUS INCLUDING THE SAME

CROSS-REFERENCE TO RELATED APPLICATION

Korean Patent Application No. 10-2011-0146573 filed on Dec. 29, 2011, in the Korean Intellectual Property Office, and entitled: "Prism Sheet, Backlight Unit Including the Same, and Optical Display Apparatus Including the Same," is incorporated by reference herein in its entirety.

BACKGROUND

Liquid crystal displays (LCDs) are widely used flat panel displays. The LCD may have a structure in which a liquid crystal layer is encapsulated between a thin film transistor array substrate and a color filter substrate.

SUMMARY

Embodiments may be realized by providing a prism sheet that includes a base film having one flat surface and an optical refractive section having a plurality of prisms arranged along a first direction to constitute first and second prism parts. The optical refractive section is integrally formed with another surface of the base film that is opposite to the flat surface of the base film, and each of the prisms has a predetermined cross-sectional shape. The first prism part includes a first prism of the plurality of prisms, which first prism has a constant height along a second direction that intersects the first direction. The second prism part includes a second prism of the plurality of prisms, which second prism has a variable height in the second direction, and a maximum value of the variable height of the second prism is higher than the constant height of the first prism.

A line connecting highest heights of the second prism along the second direction may be symmetric or asymmetric with respect to a center line of the second prism. A line connecting highest heights of the second prism along the second direction has a wave shape. A line connecting highest heights of the second prism along the second direction may intersect with a center line of the second prism. A line connecting highest heights of the second prism along the second direction may be at a distance ranging from about 50% or less of the maximum value of the variable height of the second prism, from a center line of the second prism.

The variable height of the second prism may vary periodically. A line connecting highest heights of the first prism in the second direction may be a linear line parallel to the second direction. The first prism part and the second prism part may be alternately arranged along the first direction. The first prism part may include 1 to about 30 of the first prism, and the second prism part may include at least one of the second prism.

A ratio of the variable height to the constant height may be about 1 to about 2. A height difference between the variable height and the constant height may range from about 2 μm to about 50% of the constant height. One of the first and second prisms constituting the first and second prism parts, respectively, may have a radius of curvature of about 50% or less of a pitch of the respective first and second prisms.

The one of the first and second prisms constituting the first and second prism parts, respectively, may have a triangular cross-section having a vertex angle of about 30° to about 150°.

A ratio of a first pitch of the first prism of the first prism part to a second pitch of the second prism of the second prism part may range from about 0.5 to about 1.5. The second prism of the second prism part may occupy an area of about 1% to about 90% of an overall area of the optical refractive section. A number of second prisms constituting the second prism part may range from about 1% to about 50% of a total number of prisms constituting the optical refractive section. The flat surface may be provided with an embossed pattern.

Embodiments may also be realized by a set of prism sheets that includes at least one prism sheet, which prism sheet includes a base film having one flat surface and an optical refractive section having a plurality of prisms arranged along a first direction to constitute first and second prism parts.

Embodiments may also be realized by a backlight unit that includes a prism sheet, which prism sheet prism sheet includes a base film having one flat surface and an optical refractive section having a plurality of prisms arranged along a first direction to constitute first and second prism parts.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
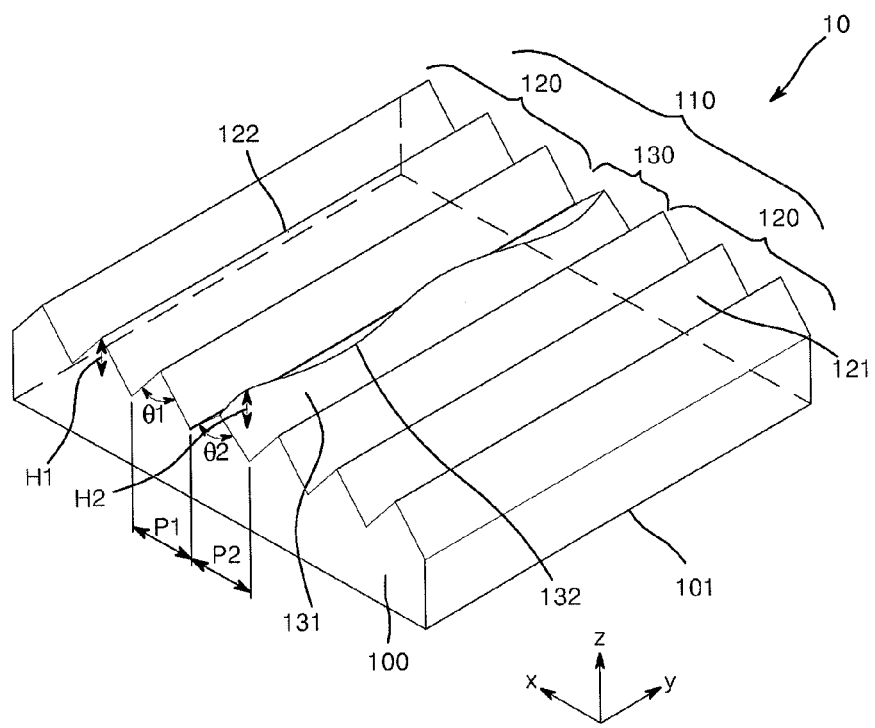
FIG. 1 illustrates a perspective view of a prism sheet according to exemplary embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

Exemplary embodiments relate to a prism sheet that includes a base film having one flat surface, and an optical refractive section having a plurality of prisms. The plurality of prisms may be formed along a first direction to constitute first and second prism parts and may be integrally formed with the other surface of the base film opposite the flat surface of the base film. Each prism may have a predetermined cross-sectional shape. The prisms of the first prism part may have a constant height along a second direction, e.g., the arrangement direction of the prisms e.g., the second direction that intersects the first direction, and the prisms of the second prism part may have a variable height along the arrangement direction of the prisms e.g., the second direction. The arrangement direction may be parallel to the one flat surface of the base film. The height of each prism may be measured along a third direction that extends, e.g., perpendicularly, from the lowermost region of the prism to an uppermost region of the prism, referring to FIG. 2 to FIG. 4. A maximum value of the variable height of the second prism part may be higher than the constant height of the first prism part.

FIG. 1 illustrates a perspective view of a prism sheet according to an exemplary embodiment.

Referring to FIG. 1, a prism sheet 10 according to one embodiment may include a base film 100 having one flat surface 101, and an optical refractive section 110 having a plurality of prisms, e.g., first and second prisms 121 and 131, integrally formed with and/or on the other surface of the base film 100 opposite the flat surface 101 of the base film 100. The plurality of prisms may be arranged within first and second prism parts 120 and 130. Each of the plurality of prisms may have a certain cross-sectional shape, e.g., a triangular shape. Referring to FIG. 1, x direction is corresponded to the first direction, y direction is corresponded to the second direction, and z direction is corresponded to the third direction.

The prism sheet 10 may be used as a light-collecting sheet that collects light. The base film 100 and the plurality of prisms constituting the optical refractive section 110 may be formed of the same or different materials. For example, both the first and second prism part units 120 and 130 may be continuously formed as one single piece with the base film 100.

The base film 100 and the optical refractive section 110 may include materials, such as thermoplastic resins or compositions including the same. For example, the base film 100 and the optical refractive section 110 may include materials that are transparent in the visible light range. Examples of the thermoplastic resins may include polyacetal resins, acrylic resins, polycarbonate resins, styrene resins, polyester resins, vinyl resins, polyphenylene ether resins, polyolefin resins, cycloolefin resins, acrylonitrile-butadiene-styrene copolymer, polyacrylate resins, polyarylsulfone resins, polyethersulfone resins, polyphenylene sulfide resins, polyethylene naphthalate resins, polyethylene resins, and fluorine resins.

The base film 100 may have a thickness ranging from, e.g., about 50 μm to about 300 μm, without being limited thereto.

The optical refractive section 110 may be formed on the other surface of the base film 100 to refract light passing through the base film 100 to have a certain orientation. The optical refractive section 110 may be integrally formed with the base film 100 by, e.g., pressing a film or pattern for the base film 100 on or into the other surface of the base film.

The optical refractive section 110 may have the plurality of prisms arranged in one direction. The optical refractive section 110 may include the first prism part 120 including at least one first prism 121 having a constant height in the arrangement direction of the prisms, and the second prism part 130 including at least one second prism 131 having a variable height in the arrangement direction of the prisms. The first prism part 120 and the second prism part 130 may be alternately arranged along the first direction, which is perpendicular to the arrangement direction of the prisms. The plurality of prisms may each elongate in a second direction, and the second direction may intersect the first direction.

Referring to FIG. 1, the optical refractive section 110 may include two first prism parts 120 and one second prism part 130 located between the first prism parts 120. However, the order of arrangement and the number of the first and second prism parts 120, 130 may vary depending on the application or the purpose of the prism sheet 10. For example, the first prism part 120 may include a plurality of the first prisms 121, and the second prism part 130 may include only one of the second prism 131 or may include more than one of the second prisms 131.

Accordingly to exemplary embodiments, the first prism part 120 may include about 1-30 first prisms, e.g., about 4-19 first prisms, about 8-15 first prisms, about 10-20 first prisms, about 15-25 first prisms, etc. The second prism part 130 may include at least one prism, e.g., about 1, 2, or 3 second prisms.

For purposes of explanation, in the optical refractive section 110 when the first and second prism parts 120, 130 are denoted by A1 and A2, respectively, the first and second prism parts 120, 130 may be disposed in an array of A1A1 . . . A2 . . . A1A1. For example, the second prism part 130 may be located at the center of the optical refractive section 110 and the first prism parts 120 may be located at both sides of the second prism part 130. For example, the second prism part 130 may only be arranged in a center region of the optical refractive section 110. The optical refractive section 110 may be defined by an entirety of the base film 100 or by a predetermined part of the base film 100. When the optical refractive section 110 is defined by a predetermined part of the base film 100, a plurality of optical refractive sections 110 may be arranged across the entirety of the base film 100.

The order of arrangement of the first and second prism parts 120, 130 is not particularly limited. For example, the first and second prism parts 120, 130 may be alternately arranged in an array of A1A2A1A2A1A2 . . . A1A2A1A2A1A2.

The prisms constituting the first and second prism parts 120, 130 may have the same or different cross-sections and may not be limited to a specific cross-section. Referring to FIG. 1, the first and second prisms 121, 131 constituting the first and second prism parts 120, 130, respectively, may have a triangular cross-section. However, it should be understood that the plurality of prisms, e.g., the first and second prisms 121, 131 constituting the first and second prism parts 120, 130, are not limited to a triangular cross-section. For example, the plurality of prisms may have any cross-sectional shape having at least two optical planes, such as a lenticular shape, a trapezoidal shape, etc., which can refract light. For example, at least one pair of optical planes of the plurality of prisms may be capable of refracting non-parallel light.

When the first and second prisms 121, 131 of the first and second prism parts 120, 130, respectively, have a triangular cross-section, the prisms 121, 131 may have a vertex angle (θ1, θ2) ranging from about 30° to about 150°. For example, the vertex angle refers to angles defined by opposite surfaces of the first and second prisms 121, 131, as shown in FIG. 1.

The first and second prisms 121, 131 constituting the first and second prism parts 120, 130, respectively, may have a radius of curvature of about 50% or less, e.g., about 2% to about 10%, of respective pitches P1 and P2.

The first prisms 121 constituting the first prism part 120 may have a constant height H1 in the arrangement direction thereof. The height H1 may range from, e.g., about 5 μm to about 250 μm, e.g., from about 5 μm to about 100 μm.

The first prisms 121 of the first prism part 120 may have, e.g., may each have, a pitch P1 ranging from about 10 μm to about 500 μm. Within this range, the first prism part 120 may improve light-collecting capabilities and brightness. For example, the first prisms 121 may have a pitch P1 ranging from about 10 μm to about 200 μm. However, embodiments are not limited thereto, e.g., the range for the pitch P1 may be about 5 μm to 100 μm, about 75 μm to about 300 μm, about 150 μm to about 250 μm, etc.

In the first prism part 120, a line connecting a highest height of the first prism 121 constituting the first prism part 120 per unit length in the arrangement direction thereof may be a linear line that may be symmetrical, asymmetrical, or identical to the center line of the prisms 121. The center line of the first prisms 121 may be a line connecting middle points of pitch of the prism per unit length in the arrangement direction thereof. For example, referring to FIG. 1, a line 122 connecting the highest heights of the first prism 121 may be a line that is parallel to the arrangement direction of the prism 121 and may overlap the center line of the prism 121.

Figure 5:
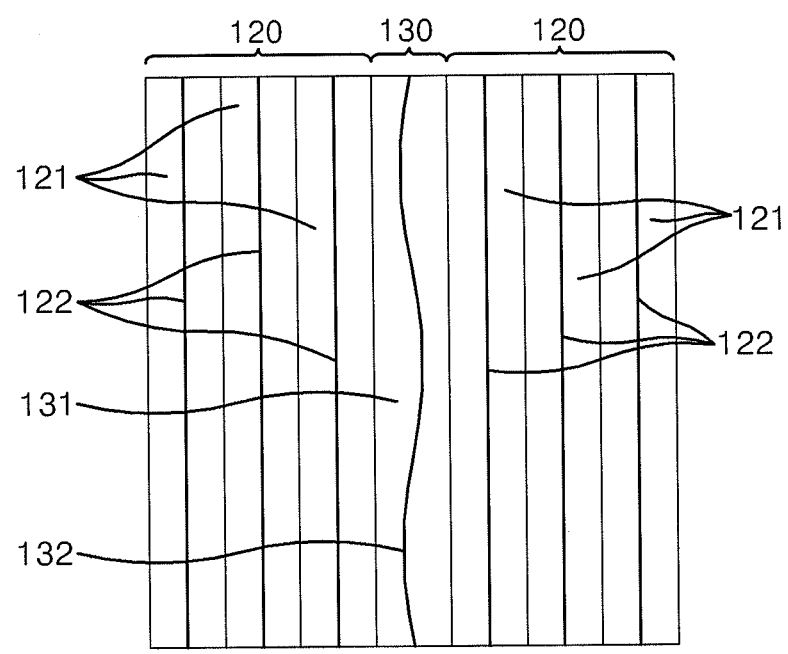
FIG. 5 illustrates a top view of the prism sheet according to one embodiment.

FIG. 5 illustrates a top view of the prism sheet according to one embodiment.

Referring to FIG. 5, a line 122 connecting the highest heights of the first prism 121 may be a line that is parallel to the arrangement direction of the prism 121 and may overlap the center line of the prism 121.

Each of the first prisms 121 may have a same maximum/highest height so that the highest heights thereof extend along the line 122, which line 122 may be a single straight line. The line 122 may also be defined as extending across the center lines of a plurality of the first prisms 121 in the first direction.

The second prisms 131 constituting the second prism part 131 may have a variable height H2 in the arrangement direction of the prisms. The variable height H2 in the second prism part 130 may provide an effect of, e.g., reducing the possibility of and/or preventing a moiré phenomenon together with the constant height H1 in the first prism part 120. According to an exemplary embodiment, an uppermost side of the second prism 131 in the second prism part 130 may be further away from the one flat surface 101 of the base film 100 than an uppermost side of the first prism 121. Upper sides of other portions of the second prism 131 may be closer to, at a same distance as, or further away from the one flat surface 101 of the base film 100 than the uppermost side of the first prism 121.

The height H2 of the second prism 131 in the second prism part 130 may range from about 5 µm to about 300 µm without being limited thereto. In this regard, a minimum/lowest height and a maximum/highest height along the center line of the second prism 131 may be within the range from about 5 µm to about 300 µm without being limited thereto. For example, the height H2 may range from about 10 µm to about 150 µm. According to an exemplary embodiment, a maximum value (or the highest height) of the variable height H2 may range from about 5 µm to about 150 µm.

In the second prism part 130, a line connecting highest heights of the second prism 131 included within the second prism part 130 per unit length in the arrangement direction thereof may be a line that may be symmetrical or asymmetrical with respect to the center line of the second prism 131. The highest heights may correspond to the vertices of the second prism 131 along the second direction.

The height H2 may vary regularly, irregularly, or periodically. For example, the height H2 may vary in a predetermined pattern to form a shape of a waveform across the second prism 131 in the arrangement direction. In another exemplary embodiment, the height H2 may vary to form a random wave pattern across the second prism 131 in the arrangement direction. Accordingly, the height H2, as measured from the one flat surface 101 of the base film 100, may vary in a predetermined or random wave pattern within a plane parallel to the base film 100.

Referring to FIG. 1, a line 132 connecting highest heights of the second prism 131 of the second prism part 130 may have a wave shape that is asymmetrical with respect to the center line of the second prism 131 in the arrangement direction. Referring to FIG. 5, a line 132 connecting the highest heights of the second prism 131 of the second prism part 130 may have a wave shape that is asymmetrical with respect to the center line of the second prism 131 in the arrangement direction.

The line 132 that connects the highest heights of the second prism 131 of the second prism part 130 per unit length in the arrangement direction may have at least one highest point. The highest point may indicate a point that is highest along the length of the second prism 131. Accordingly to an exemplary embodiment the line 132 that connects the highest heights of the second prism 131 of the second prism part 130 per unit length in the arrangement direction thereof may also intersect the center line of the second prism 131. For example, the line 132 may extend on opposite sides of the center line of the second prism 131.

The line 132 that connects the highest heights of the second prism 131 of the second prism part 130 per unit length in the arrangement direction thereof may be at a distance of about 50% or less of the height H2, from the center line thereof. For example, the distance may be about 50% or less of the highest height H2 along the arrangement direction of the prisms. Within these ranges, a waveform curve may be obtained. For example, the line 132 may be in a distance from about 2% to about 10%, from the center line of the prism 131, e.g., the line 132 may vary along an entire length thereof along different distances ranging from about 2% to about 10% from the center line of the prism 131.

The second prisms 131 of the second prism part 130 may have a pitch P2 ranging from about 10 µm to about 500 µm. Within this range, the second prism part may have an effect of improving light-collecting capabilities and brightness. For example, the prisms of the second prism part may have a pitch P2 ranging from about 10 µm to about 100 µm. However, embodiments are not limited thereto, e.g., the range for the pitch P2 may be about 5 µm to 100 µm, about 75 µm to about 300 µm, about 150 µm to about 250 µm, 10 µm to about 200 µm, etc.

The second prism part 130 may occupy an area of about 1% to about 90% of the overall area of the optical refractive section 110. For example, in the optical refractive section 110, the number of prisms constituting the second prism part 130 may range from about 1% to about 50% of the total number of prisms constituting the optical refractive section 110, i.e. the total number of the plurality of prisms in the optical refractive section 110. Within this range, the prism sheet 10 may have improved scratch resistance.

The maximum value of the height H2 of the second prism 131 of the second prism part 130 may be higher than the height H1 of the first prisms 121 in the first prism part 120. If the height H2 is higher than the height H1, it may be more difficult for scratches to be formed on the prism sheet 10 and the possibility of damage to the prism pattern may be reduced and/or prevented when an optical sheet is stacked on the prism sheet 10. Accordingly, damage such as scratches on the prism sheet 10 may be avoided.

The ratio of the maximum value of the height H2 (e.g., the height at the highest point) to the height H1 may be higher than 1 and 2 or less, e.g., may be between about 1 and about 2. For example, the ratio of the maximum value of the height H2 to the height H1 may be from about 1.05 to about 1.5. However, embodiments are not limited thereto, e.g., the range may be from about 1.25 to about 1.75, about 1.35 to about 1.45, about 1.10 to about 1.30, etc. Within these ranges, it may be more difficult for scratches to be formed on the prism sheet 10 and the possibility of damage of the prism pattern may be reduced and/or prevented. Accordingly, damage such as scratches on the prism sheet 10 may be avoided.

A height difference between the maximum value (for example the highest height realized in the second prism 131) of the height H2 and the height H1 ("maximum value of H2−H1") may be about 50% or less of the height H1. For example, the height difference ranges from about 2 μm to about 50% of the height H1. Accordingly, if height H1 is 50 μm, the height difference ranges from about 2 μm to about 25 μm. Within this range, the prism sheet 10 may be attached to a backlight unit without generation of scratches thereon. If the height difference ("maximum value of H2−height H1") is less than 2 μm, scratches may be generated on the prism sheet, which may damage the prism pattern. For example, the height difference has a height of about 8% to about 40% of the height H1.

A ratio of the pitch P2 to the pitch P1 may range from about 0.5 to about 1.5.

Figure 2:
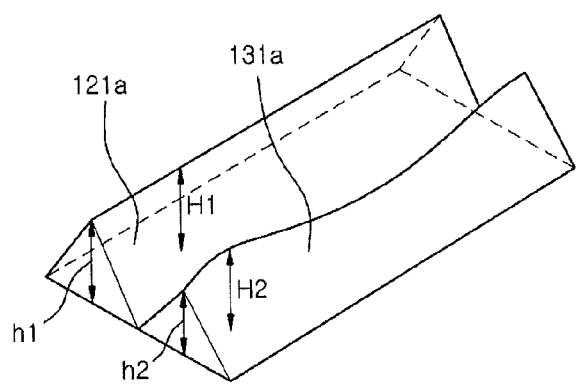
FIGS. 2, 3, and 4 illustrate views of exemplary combinations of first and second prism parts.
Figure 3:
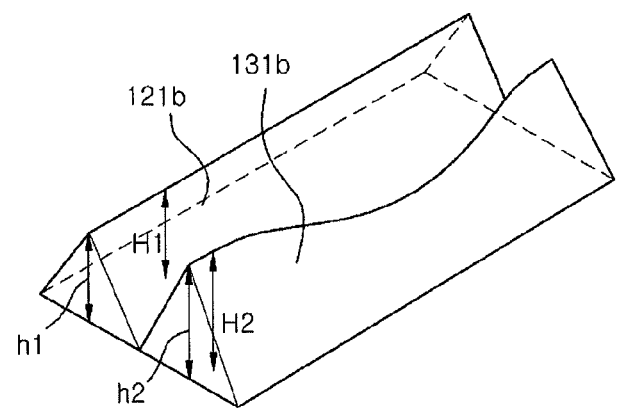
Figure 4:
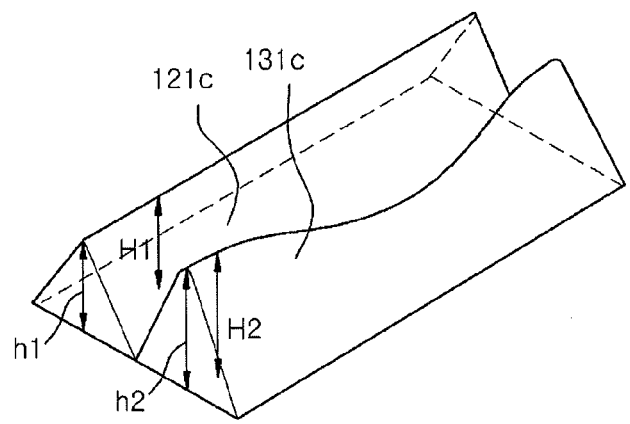

FIGS. 2 to 4 show exemplary combinations of the prisms of first and second prism parts (e.g., the first and second prism parts 120 and 130 illustrated in FIG. 1), wherein one first prism 121a, 121b, 121c and one second prism 131a, 131b, 131c are combined. However, the order of arrangement or the number of prisms may be varied.

Referring to FIG. 2, first prisms 121a constituting a first prism part may have a height H1 and a height h1 at one end of the first prism part. The height H1 and the height h1 may be the same. Second prisms 131a constituting a second prism part may have a maximum height H2 and height h2 at one end of the second prism part. The maximum height H2 may be greater than the height h2. The height h2 may be a minimum height of the second prisms 131a. A ratio of H2/H1 may exceed 1, and a ratio of h1/h2 may also exceed 1. The height difference of maximum height H2—height H1 may be about 50% or less of the height H1.

Referring to FIG. 3, first prisms 121b constituting a first prism part may have a height H1 and a height h1 at one end of the first prism part, and second prisms 131b constituting a second prism part may have a maximum height H2 and a height h2 at one end of the second prism part. A ratio of H2/H1 may exceed 1 and the height difference of maximum height H2−height H1 may be about 50% or less of the height H1. A ratio of h2/h1 may also exceed 1.

Referring to FIG. 4, first prisms 121c constituting a first prism part may have a height H1 and a cross-sectional height h1, and second prisms 131c constituting a second prism part may have a maximum height H2 and a cross-sectional height h2. A ratio of H2/H1 may exceed about 1, and a ratio of h2/h1 may also exceed 1. The second prisms 131c of the second prism part 130 may form a curved surface and may have a radius of curvature of 50% or less of the pitch thereof. The height difference of maximum height H2—height H1 may be about 50% or less of the height H1.

Referring to FIG. 1, the flat surface 101 of the base film 100 may be a surface on which light is incident from a light source and through which incident light passes to the optical refractive section 110, which optical refractive section 110 may be defined by the first and second prism parts 120, 130. The flat surface 101 of the base film 100 may be further provided with an embossed pattern (not shown). The embossed pattern may be a convexly or concavely embossed irregular pattern, which may be formed by striking the flat surface with about 1-200 μm diameter beads. The embossed pattern, e.g., a convexly or concavely embossed irregular pattern, may scatter light, reduce the possibility of and/or prevent the generation of scratches, and increase hardness.

Figure 6:
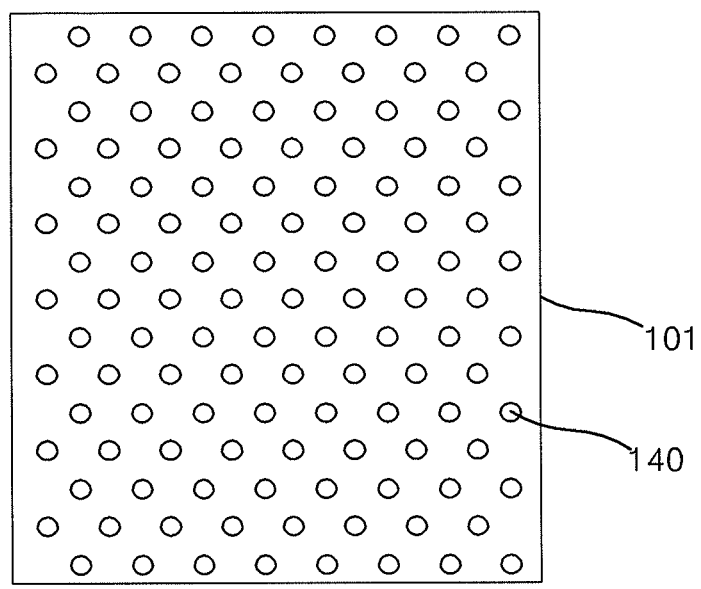
FIG. 6 illustrates a bottom view of the prism sheet according to an embodiment.

FIG. 6 illustrates a bottom view of the prism sheet according to an embodiment.

Figure 7:
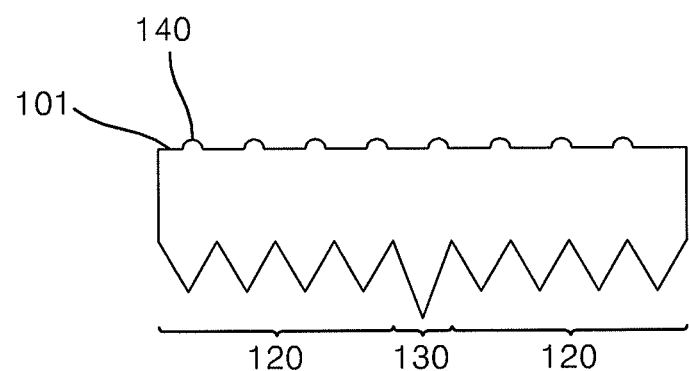
FIG. 7 illustrates a cross-sectional view of the prism sheet according to an embodiment.

FIG. 7 illustrates a cross sectional view of the prism sheet according to an embodiment.

Referring to FIGS. 6 and 7, the flat surface 101 of the base film 100 may be provided with an embossed pattern 140.

According to an exemplary embodiment, a set of prism sheets may include one or more prism sheets 10 described in the above. According to an exemplary embodiment, the set of prism sheets may include at least two prism sheets 10, e.g., stacked on top of each other.

Figure 8:
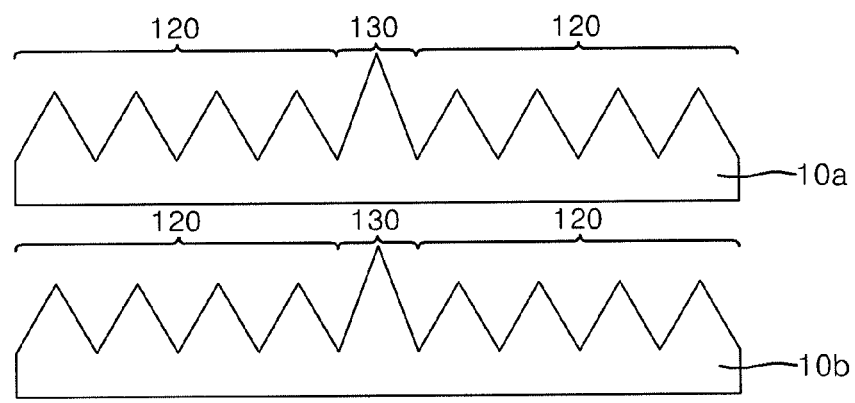
FIG. 8 illustrates a set of prism sheets according to one embodiment.

FIG. 8 is a sectional view of a set of prism sheets according to one embodiment of the present invention.

Referring to FIG. 8, the set of prism sheets may comprise two prism sheets 10a and 10b, e.g., stacked on top of each other, the prism sheet 10a comprising the first prism parts 120 and the second prism part 130, and the prism sheet 10b comprising the first prism parts 120 and the second prism part 130.

According to an exemplary embodiment, an optical display apparatus may include comprising a backlight unit comprising the prism sheet 10 or the set of prism sheets.

Figure 9:
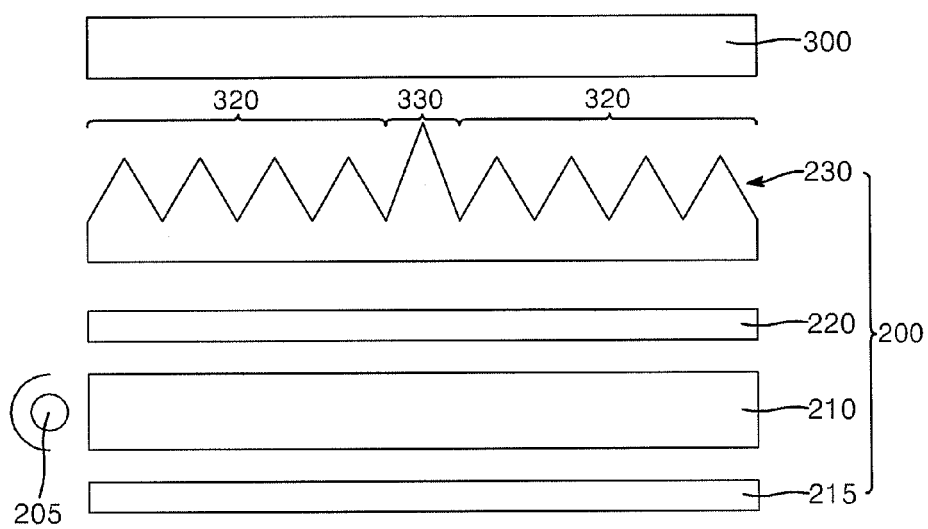
FIG. 9 illustrates a backlight unit according to one embodiment.

FIG. 9 is a sectional view of a backlight unit according to one embodiment of the present invention.

Referring to FIG. 9, the backlight unit 200 may include a light source 205, a light guide plate 210, a reflection plate 215, a diffusion sheet 220 and a prism sheet 230.

The light source 205 may be disposed at one of a side surface or a rear surface of the light guide plate 210. The light source 205 may be cold cathode fluorescence lamp (CCFL), or LED (light emitting diode).

The light guide plate 210 may be disposed below LCD panel 300 and near a side of the light source 205.

The reflection plate 215 may be disposed below the light guide plate 210.

The diffusion sheet 220 may be disposed above the light guide plate 210.

The prism sheet 230 may be disposed above the diffusion plate 220. The prism sheet 230 may include a base film 100 and a first prism part 320 and a second prism part 330 formed on the base film 100.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

EXAMPLES

Example 1

A prism sheet including a base film and an optical refractive section formed on the base film was fabricated. The optical refractive section included a first prism part (A1) including 19 prisms and a second prism part (A2) including a single prism, which are arranged in the order of A1A1 . . . A2 . . . A1A1. The prisms of the first prism part had a triangular cross-section, a height of 25 μm, and a pitch of 50 μm. The prism A2 of the second prism part had a triangular cross-section, a height of 23~27 μm, a maximum height of 27 μm, and a pitch of 50 μm. The line connecting the height of the prism of the second prism part had a wave shape.

Example 2

A prism sheet including a base film and an optical refractive section formed on the base film was fabricated. The optical refractive section included a first prism part (A1) including 10 prisms and a second prism part (A2) including a single prism, which were arranged in the order of A1A1 . . . A2 . . . A1A1. The prisms of the first prism part had a triangular cross-section, a height of 25 μm, and a pitch of 50 μm. The prism of the second prism part had a triangular cross-section, a height of 31~35 μm, a maximum height of 35 μm, and a pitch of 66 μm. The height difference between the prisms of the first prism part and the prism of the second prism part was 6~10 μm. The line connecting the height of the prism of the second prism part had a wave shape.

Example 3

A prism sheet including a base film and an optical refractive section formed on the base film was fabricated. The optical refractive section included a first prism part (A1) including 19 prisms and a second prism part (A2) including a single prism, which were arranged in the order of A1A1 . . . A2 . . . A1A1. The prisms of the first prism part had a triangular cross-section, a height of 25 μm, and a pitch of 50 μM. The prism of the second prism part had a triangular cross-section, a height of 31~35 μm, a maximum height of 35 μm, and a pitch of 66 μm. The second prism had a radius of curvature of 2 μm The height difference between the prisms of the first prism part and the prism of the second prism part was 6~10 μm. The line connecting the height of the prism of the second prism part had a wave shape.

Comparative Example 1

A prism sheet was fabricated in the same manner as that of Example 1 except that the optical refractive section including only the first prism part was formed on the base film.

Comparative Example 2

A prism sheet was fabricated in the same manner as that of Example 1 except that the optical refractive section including only the second prism part was formed on the base film.

Comparative Example 3

A prism sheet including a base film and an optical refractive section formed on the base film was fabricated. The optical refractive section included a first prism part (A1) including 19 prisms and a second prism part (A2) including a single prism, which were arranged in the order of A1A1 . . . A2 . . . A1A1. The prisms of the first prism part had a triangular cross-section, a height of 25 μm, and a pitch of 50 μm. The prism of the second prism part had a triangular cross-section, a height of 26 μm, a pitch of 52 μm, and a maximum height of 26 μm. The second prism part had a radius of curvature of 2 μm. The height difference between the prisms of the first prism part and the prism of the second prism part was 1 μm. The line connecting the height of the prism of the second prism part had a wave shape.

Experimental Example

The fabricated prism sheets were tested as to brightness and scratch resistance.

(1) Brightness Gain: A diffuser sheet and a prism sheet were first engaged with an edge-type backlight unit for a 32-in LCD. Brightness was measured using an SR3 spectral radiometer available from TOPCON Co., Ltd. Brightness gain is the ratio of brightness values before and after engagement of the prism sheet. The brightness gain was obtained by calculating the ratio of the brightness value after engagement of the prism sheet to the brightness value before engagement of the prism sheet.

Three prism sheet samples were prepared for each test, and brightness was measured at the central point for each sheet. A brightness value (A) of the diffuser sheet was first measured and then a brightness value (B) after the prism sheet was engaged with the diffuser sheet. The brightness gain was obtained by calculating the ratio of B/A.

(2) Relative Brightness: A percentage (G2/G1×100) of respective brightness gains (G2) of the prism sheets of Example 2 and Comparative Examples 1 to 3 to the brightness gain (G1) of the prism sheet of Example 1 was calculated.

(3) Scratch Resistance: A low-reflective polarizing plate was stacked on each of the fabricated prism sheets. In this regard, 20 g, 40 g, 60 g, 100 g, 200 g, and 300 g weights were serially loaded on the prism sheet. Respective weights were moved back and forth a distance of 3 cm three times, and then scratch resistance was evaluated by checking the weight at which scratch was generated on the prism sheet. Here, a higher scratch-generating weight indicates higher scratch resistance.

TABLE 1

|  | Brightness Gain | Relative Brightness (%) | Scratch Resistance (g) |
| --- | --- | --- | --- |
| Example 1 | 1.86 | 100 | 100 |
| Example 2 | 1.84 | 99 | 200 |
| Example 3 | 1.82 | 98 | 300 |
| Comparative Example 1 | 1.86 | 100 | 20 |
| Comparative Example 2 | 1.79 | 96 | 40 |
| Comparative Example 3 | 1.82 | 98 | 60 |

As can be seen in Table 1, the prism sheets of Examples 1-3 had the effect of improving scratch resistance while minimizing brightness reduction. On the contrary, the prism sheets in Comparative Examples 1 and 2 having an optical refractive section that consists of only the first or second prism part, respectively, had considerably reduced brightness or reduced scratch resistance. Further, the prism sheet in Comparative Example 3 having the first and second prism parts had scratch resistance when the height difference was 1 μm.

By way of summation and review, LCDs display an image through rearrangement of liquid crystal molecules in the liquid crystal layer, e.g., upon application of voltage across electrodes on an array substrate and a color filter substrate. Since the LCD cannot emit light by itself, a backlight unit is used. The backlight unit may include a light source such as a light-emitting diode, a fluorescent lamp, or the like, a light guide plate, a prism sheet, a diffuser sheet, a protective sheet, and the like.

The prism sheet may have regular patterns of triangular cross-sections and may collect light to improve brightness. For example, the backlight unit includes one or more prism sheets stacked one above another, and each of the prism sheets has a specified pattern at an upper portion thereof and an uneven pattern at a lower portion thereof.

When an optical sheet such as a protective sheet is further stacked on such a prism sheet, scratches can be created on the prism sheet. The scratches may deteriorate an outer appearance and brightness of products, thereby causing defects.

In contrast, embodiments relate to a prism sheet, a backlight unit including the prism sheet, and an optical display apparatus including the backlight unit. For example, embodiments relates to a prism sheet that is capable of minimizing brightness reduction, improving scratch resistance, and eliminating a protective film on an optical sheet to reduce manufacturing costs, a backlight unit including the prism, and an optical display apparatus including the backlight unit.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A prism sheet, comprising:
a base film having one flat surface; and
an optical refractive section having a plurality of prisms arranged along a first direction to constitute first and second prism parts, the optical refractive section being integrally formed with another surface of the base film that is opposite to the flat surface of the base film, each of the prisms having a predetermined cross-sectional shape, wherein:
the first prism part includes a first prism of the plurality of prisms, which first prism has a constant height along a second direction that intersects the first direction, and
the second prism part includes a second prism of the plurality of prisms, which second prism has a variable height in the second direction, a maximum value of the variable height of the second prism being higher than the constant height of the first prism,
wherein a line connecting highest heights of the second prism along the second direction is at a distance ranging from about 50% or less of the maximum value of the variable height of the second prism, from a center line of the second prism.

2. The prism sheet as claimed in claim 1, wherein the line connecting highest heights of the second prism along the second direction is symmetric or asymmetric with respect to the center line of the second prism.

3. The prism sheet as claimed in claim 1, wherein the line connecting highest heights of the second prism along the second direction has a wave shape.

4. The prism sheet as claimed in claim 1, wherein the line connecting highest heights of the second prism along the second direction intersects with the center line of the second prism.

5. The prism sheet as claimed in claim 1, wherein the variable height of the second prism varies periodically.

6. The prism sheet as claimed in claim 1, wherein the line connecting highest heights of the first prism in the second direction is a linear line parallel to the second direction.

7. The prism sheet as claimed in claim 1, wherein the first prism part and the second prism part are alternately arranged along the first direction.

8. The prism sheet as claimed in claim 1, wherein the first prism part includes 1 to about 30 of the first prism and the second prism part includes at least one of the second prism.

9. The prism sheet as claimed in claim 1, wherein a ratio of the variable height to the constant height is about 1 to about 2.

10. The prism sheet as claimed in claim 1, wherein a height difference between the variable height and the constant height ranges from about 2 μm to about 50% of the constant height.

11. The prism sheet as claimed in claim 1, wherein the one of the first and second prisms constituting the first and second prism parts, respectively, has a triangular cross-section having a vertex angle of about 30° to about 150°.

12. The prism sheet as claimed in claim 1, wherein the second prism of the second prism part occupies an area of about 1% to about 90% of an overall area of the optical refractive section.

13. The prism sheet as claimed in claim 1, wherein a number of second prisms constituting the second prism part ranges from about 1% to about 50% of a total number of prisms constituting the optical refractive section.

14. The prism sheet as claimed in claim 1, wherein the flat surface is provided with an embossed pattern.

15. A set of prism sheets comprising at least one prism sheet as claimed in claim 1.

16. A backlight unit comprising a prism sheet as claimed in claim 1.

17. A prism sheet, comprising:
a base film having one flat surface; and
an optical refractive section having a plurality of prisms arranged along a first direction to constitute first and second prism parts, the optical refractive section being integrally formed with another surface of the base film that is opposite to the flat surface of the base film, each of the prisms having a predetermined cross-sectional shape, wherein:
the first prism part includes a first prism of the plurality of prisms, which first prism has a constant height along a second direction that intersects the first direction, and
the second prism part includes a second prism of the plurality of prisms, which second prism has a variable height in the second direction, a maximum value of the variable height of the second prism being higher than the constant height of the first prism,
wherein one of the first and second prisms constituting the first and second prism parts, respectively, has a radius of curvature of about 50% or less of a pitch of the respective first and second prisms.

18. A backlight unit comprising a prism sheet as claimed in claim 17.

19. A prism sheet, comprising:
a base film having one flat surface; and
an optical refractive section having a plurality of prisms arranged along a first direction to constitute first and second prism parts, the optical refractive section being integrally formed with another surface of the base film that is opposite to the flat surface of the base film, each of the prisms having a predetermined cross-sectional shape, wherein:
the first prism part includes a first prism of the plurality of prisms, which first prism has a constant height along a second direction that intersects the first direction, and
the second prism part includes a second prism of the plurality of prisms, which second prism has a variable height in the second direction, a maximum value of the variable height of the second prism being higher than the constant height of the first prism, wherein a ratio of a first pitch of the first prism of the first prism part to a second pitch of the second prism of the second prism part ranges from about 0.5 to about 1.5.

20. A backlight unit comprising a prism sheet as claimed in claim 19.

* * * * *